United States Patent
Szymanski

[15] 3,696,238
[45] Oct. 3, 1972

[54] DUAL PURPOSE LUMINOUS HEADLIGHT SAFETY RING AND FOG LENS ATTACHMENT MEANS

[72] Inventor: Ronald Szymanski, 19019 W. Coffee Road, New Berlin, Wis. 53151

[22] Filed: Oct. 21, 1970

[21] Appl. No.: 82,689

[52] U.S. Cl............240/46.59, 240/2.25, 240/41 R, 240/46.57, 240/52.15
[51] Int. Cl................................................F21v 9/08
[58] Field of Search............240/41, 52.15, 8.3, 46.57, 240/46.59, 41.38

[56] References Cited

UNITED STATES PATENTS

| | | |
|---|---|---|
| 3,382,354 | 5/1968 | Hedgewick et al. .....240/41.38 |
| 3,387,127 | 6/1968 | Ericks.........................240/41 |
| 3,334,220 | 8/1967 | Komiske.............240/52.15 X |
| 1,847,134 | 3/1932 | Nikonow....................240/8.3 |
| 2,744,187 | 5/1956 | Moak..................240/45.59 X |
| 3,283,143 | 11/1966 | Goshell...................240/46.59 |
| 3,350,557 | 10/1967 | Szymanski..............240/46.57 |

Primary Examiner—Samuel S. Matthews
Assistant Examiner—Richard M. Sheer
Attorney—Morsell & Morsell

[57] ABSTRACT

A flexible ring is provided which can be readily removably clipped onto and surrounding a vehicle headlight to detachably magnetically secure a tinted translucent lens over the headlight to aid in driving in fog or inclement weather, and which novel ring attachment is provided with a luminous reflective surface adapted to warn an approaching motorist in the event one of the headlights on the vehicle is burned out or inoperative, as well as alerting oncoming motorists of the location of a parked car at night, thus permitting the advantageous use of said ring device even without said removable fog lens.

1 Claim, 5 Drawing Figures

PATENTED OCT 3 1972
3,696,238
Fig.1
Fig.2
Fig.3
Fig.4
Fig.5
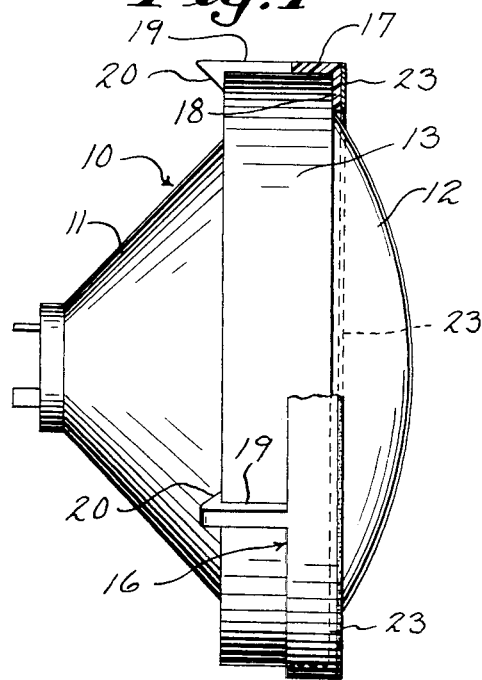
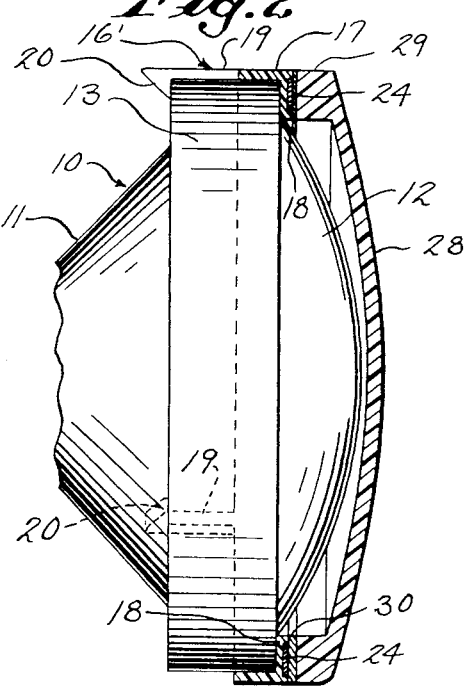
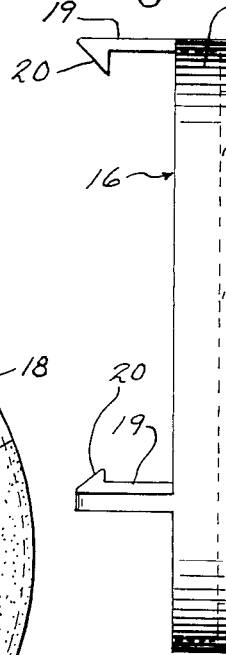
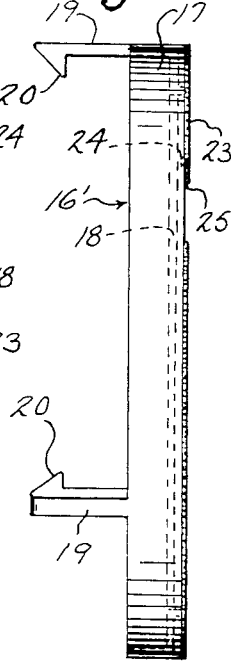
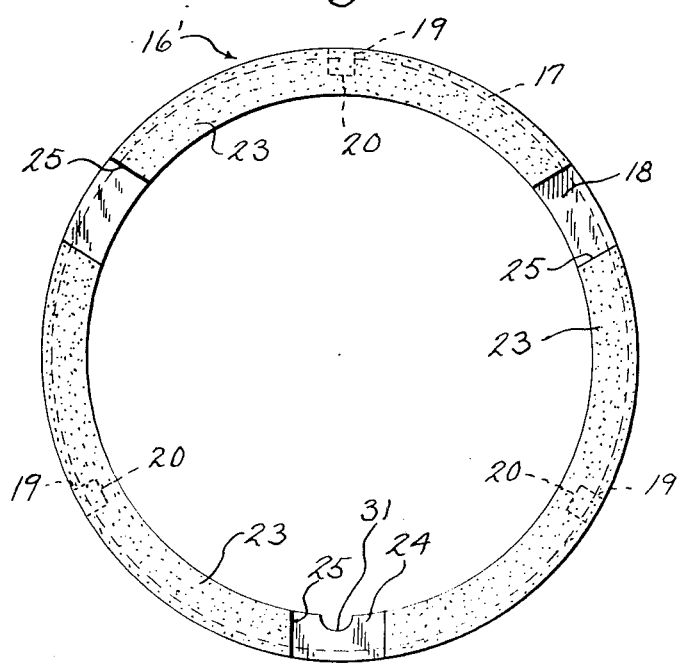
INVENTOR
RONALD SZYMANSKI
BY
Morsell & Morsell
ATTORNEYS

DUAL PURPOSE LUMINOUS HEADLIGHT SAFETY RING AND FOG LENS ATTACHMENT MEANS

BACKGROUND OF THE INVENTION

1. Field of the Invention

The present invention relates to automobile and other vehicle headlights and more particularly to a dual purpose safety device for said headlights.

2. Description of the Prior Art

U.S. Pat. No. 3,350,557, entitled "Fog Lens Attachment for Vehicle Headlights," dated Oct. 31, 1967, is owned by the present applicant, and the invention hereinafter described is intended as an improvement upon and supplement to the device disclosed in said prior patent.

The invention disclosed in said U.S. Pat. No. 3,350,557 comprises a colored plastic fog lens attachment which can be detachably mounted over the headlight of an automobile or other vehicle to temporarily convert the same into a fog light, said plastic lens member having a magnetized ring embedded therein which is attracted to and attaches itself to the metal retaining rim of the headlight. Said removable fog lens device has met with considerable commercial success, but, unfortunately, it has been found that the circular ring magnet employed in said device is relatively expensive and adds substantially to the cost of said fog lens attachment. One of the objects of the present invention, therefore, is to provide a removable fog lens device utilizing different, less expensive magnetic attachment means, and, in addition, in accordance with the present invention the lens-retaining ring is provided with a luminous surface adapted to reflect the lights on an oncoming car to alert an approaching motorist in the event one of said headlights is inoperative, as well as apprising motorists of the location of a parked vehicle at night.

To the best of applicant's knowledge there are no presently available lens attachments for vehicle headlights employing novel magnetic attachment elements such as those featured in the present invention nor is there any available headlight attachment utilizing a luminous surface to provide reflective warning means to approaching motorists, as in the present invention.

Prior patents disclosing vehicle headlight attachment devices include the following U.S. patents: U.S. Pat. Nos. 2,530,625; 2,744,187, and 3,283,143; and Italian Pat. No. 379,004.

SUMMARY OF THE INVENTION

As hereinabove described, the principal object of the present invention is to provide a novel dual purpose ringlike attachment for a vehicle headlight which is designed to removably retain a tinted plastic lens over said light when it is desired to temporarily convert the headlight to a fog light, and which ring member is provided with a reflective luminous surface which surrounds the headlamp and alerts approaching motorists in the event the light is not working, as well as indicating to motorists the location of a parked car or other vehicle at night.

A further object of the present invention is to provide a removable fog lens device utilizing magnetic attachment means which are an improvement over the attachment means disclosed in U.S. Pat. No. 3,350,557.

A further object is to provide a novel luminous retaining ring which can be used to secure a colored plastic lens over a headlamp to convert the same to a fog light as well as providing a reflective warning device to oncoming cars, as described, or which ring member can be formed without said magnetic fog lens retaining means and utilized solely as a novel inexpensive reflector to alert approaching motorists of an inoperative headlight, or of the presence of a parked vehicle at night.

A further object is to provide a novel ring device for the purposes described which can be formed of relatively inexpensive plastic or comparable material.

A further object is to provide a ring device as described which is formed of a flexible material permitting said ring to be easily manually clipped onto the metal retaining rim of a headlamp, and without requiring any special tools or equipment.

A further object of the invention is to provide a novel dual purpose headlight attachment device as described which is small and compact, and which can be easily stored in the glove compartment or other convenient location in a vehicle when not in use.

Still further objects of the present invention are to provide a vehicle headlight attachment for the purposes described which device is simple and inexpensive to manufacture, which is durable and long-lasting in construction, which is easy to use, and which is otherwise particularly well adapted for its intended purposes.

BRIEF DESCRIPTION OF THE DRAWING

In the accompanying drawing, illustrating a preferred embodiment of the invention and a modified form thereof, and wherein the same reference numerals designate the same parts in all of the views:

FIG. 1 is a side elevational and partly sectional view of a vehicle headlamp with the novel ring device comprising the invention mounted thereon, the illustrated form of the invention being designed to function merely as a reflective warning device and not including means for magnetically retaining a plastic fog lens thereon;

FIG. 2 is a similar side elevational and sectional view showing a modified ring device having a plastic fog lens magnetically secured thereto in covering relation to the headlight;

FIG. 3 is a side elevational view of the ring device illustrated in FIG. 1;

FIG. 4 is a view similar to FIG. 3 showing the form of said ring device adapted to magnetically retain a fog lens; and FIG. 5 is a front, plan view of the ring device illustrated in FIG. 4.

DESCRIPTION OF THE PREFERRED EMBODIMENTS

Referring now more particularly to FIGS. 1 and 2 of the drawing, illustrated therein is a conventional vehicle headlight 10 including a rearwardly tapered housing 11 within which the light bulb or bulbs and associated electrical connections (not shown) are mounted. A concavo-convex glass lens 12 is mounted over the open forward end of said headlight housing, and said lens is secured in place thereon by means of a circular metal rim member 13 having a flanged forward edge which clampingly retains said lens in position, said rim member being screwed or otherwise removably secured to the housing 11, all of which is conventional and well known in the art.

Motor vehicles are provided with at least two of said headlamps 10 mounted in spaced relation on the front of the vehicle, and most modern automobiles, trucks, and buses are provided with dual sets of two or more of said lights for increased visibility at night.

With respect now to the novel headlight attachment device comprising the present invention, which is designated generally by the numeral 16 in the drawings, the more simplified form of said invention which is intended merely as a reflective warning device is illustrated in FIGS. 1 and 3 of the drawing and will be first described.

As is shown in said FIGS. 1 and 3, said attachment device 16 comprises a ring which is molded or otherwise formed of a flexible, tough durable plastic or comparable inexpensive flexible, material, and includes a flat, horizontal body portion 17 and an inwardly directed vertical front flange 18. Said ring member is of a circumference to closely surround the aforementioned headlight lens-retaining rim 13, the flat body portion 17 of said ring being of a width substantially less than said lens-retaining rim, while said ring front flange 18 is designed to extend downwardly to a point immediately adjacent the outer peripheral edge of the headlight lens 12 (FIG. 1).

Said flexible plastic ring member 16 is provided with three (or any desired number) equally spaced, rearwardly extending arm members 19 having inturned hook elements 20 formed on their outer ends, and to install said ring member 16 on a headlight it is merely necessary to slip the same on and surrounding the headlight rim 13 and the flexibility of said arm members 19 causes the hook portions 20 thereof to securely engage with the rearward edge of said rim member. The result is that said plastic ring member can be mounted on the headlight without the use of any tools, and once mounted thereon it cannot be removed without considerable difficulty, thereby discouraging the theft of said rings and eliminating the possibility of their coming off in use.

With reference still in FIGS. 1 and 3 of the drawing, adhesively adhered or otherwise permanently secured to the vertical surface provided by the inturned flange 18 of said ring attachment is a strip 23 of luminous, reflective material. Alternatively said luminescent material could be painted thereon, and the invention is not to be limited in this respect. Moreover, while an amber or white reflective strip has been found to provide excellent visibility neither is the invention to be limited or confined in this respect and other colors having suitable reflective properties could be utilized if preferred.

As will be readily appreciated, with said ring member 16 mounted in surrounding relation on the headlight of a car or other vehicle, in the event the headlight is burned out or inoperative the reflection of said circular border 23 therearound will clearly indicate the presence of said burned-out light to an oncoming vehicle, and there will be no possibility of the approaching motorist mistaking the vehicle for a motorcycle or the like, which can be particularly dangerous in the event it is the headlight closest to the center line of the road which is inoperative. Thus the approaching motorist will be adequately forewarned and can take precaution to ensure enough room therebetween as the two vehicles meet and pass on the highway.

A further important advantage of said luminous border 23 surrounding the headlights of a vehicle is that when a car or other vehicle is parked on the side of a highway or road at night with its lights out the vehicle is not usually visible to an approaching motorist until he is almost upon it, since there are ordinarily no reflectors on the front of a car, and it is not infrequent that a collision results, but with the novel reflective warning rings surrounding the headlamps with the present invention the approaching motorist is immediately alerted by the reflection of said unique rings to the presence of the parked vehicle, and he has ample time to take the necessary action to avoid the same.

With respect now to the form of the present invention which is designed to perform the twofold function of providing a luminescent reflective warning signal for approaching motorists, as described, and to also provide means for detachably mounting a tinted plastic lens over the headlight when a fog light is desired, attention is directed to FIGS. 2, 4 and 5 of the drawing.

As will be seen in said views, the novel ringlike attachment device 16' is almost identical to the ring member 16 hereinabove described, with the exception that molded or otherwise permanently mounted on the flanged portion 18 of said flexible plastic member is a steel ring 24 over which the luminescent tape or covering 23 is applied. In the illustrated embodiment of the invention, and as best appears in FIG. 5, the fluorescent covering strip or layer 23 on said vertical flange member 18 is provided with a plurality of equally spaced cutouts 25 exposing the steel ring 24 therebeneath, there being three of said cutouts 25 in the illustrated form of the invention, although the number and spacing of said cutouts or gaps is not critical and can be varied as desired.

As is shown in FIG. 2 a tinted plastic lens 28 is adapted to be mounted in covering relation to the headlight lens 12 when it is desired to temporarily convert said headlight to a fog light, an amber or yellow colored lens increasing the penetrating powers of the headlights and providing greatly increased visibility in fog or rain, as is described in detail in the aforementioned U.S. Pat. No. 3,350,557. Said lens cover 28 is formed of a high-heat-restraint plastic in order to withstand the heat generated by the headlamp, and said lens cover is formed on a radius of curvature greater than that of the headlight lens 12 and is designed with a peripheral flange 29 thereon adapted to be positioned abutting and coextensive with the ring flange 18 surrounding the periphery of the headlight lens.

In accordance with the invention said plastic lens covering 28 is provided with relatively short bar magnets 30 (FIG. 2) which are substantially less expensive and more practical than the circular ring magnets employed in said prior patent, there being three of said bar magnets in the preferred form of the invention mounted in predetermined spaced locations adapted to correspond with the spaces or gaps 25 between the luminous material sections on the front face of the ring attachment 16'. Said bar magnets are embedded in the flanged portion of said plastic lens member with their surfaces flush with the surface of said lens flange. As mentioned, it is to be understood that the number and location of said spaces 25 and bar magnets 30 can be varied as desired. When it is intended to temporarily mount the fog lens attachment 28 on the headlight it is merely necessary to align the bar magnets 30 with the exposed portions of the steel ring 24 and said plastic lens cover will be securely retained in position by the attraction of said magnets to said exposed steel ring portions, the proper alignment of said ring and plastic lens being facilitated by the provision of an arcuate cutout 31 (FIG. 5) adjacent the bottom of said ring which is adapted to receive a protruding stud (not shown) ordinarily formed on the front face of a conventional headlight.

In lieu of forming spaced cutouts or gaps 25 in the covering layer of luminescent material 23 in order to provide exposed metal areas for the attachment of said bar magnets 30, within the scope of the invention it is also possible to utilize a relatively thin covering layer or coating of said luminescent material so that the magnets will be attracted to the metal beneath said luminescent layer without the necessity of forming spaces or gaps in said covering material, and the invention is not to be limited in this respect.

When the requirement for fog lights is no longer present the motorist can readily pull said tinted plastic lens covers 28 free, overcoming the magnetic attraction between said magnets 30 and the metal ring 24, and because of their compact size said fog lenses can be stored in the glove compartment or other convenient location in the vehicle until the next time they are required. The fog lens retaining rings 16 can also be removed from the vehicle headlamps if desired, but because of the important function of said rings as reflective warning devices, as hereinbefore described, it is contemplated that in most instances the motorist will prefer to retain the same on his headlamps at all times.

From the foregoing detailed description it will be seen that the present invention provides a novel dual purpose headlight attachment for cars and other vehicles. With the present invention simplified magnetic means are provided for attaching a tinted plastic lens over a conventional vehicle headlight to temporarily convert the same to a fog light when desired, and, in addition, the novel retaining ring featured in the invention is provided with a reflective luminous surface which surrounds the headlamp to alert approaching motorists in the event the headlight is not working, as well as indicating to motorists the location of a parked vehicle at night.

Further important advantages of the present invention are that the novel retaining ring characterizing said invention can be formed of relatively inexpensive plastic or comparable low cost but durable and longlasting material, said retaining ring can be readily manually installed without the use of any tools, and the assembly is small and compact for storage in the glove compartment or other convenient location in a vehicle.

It is to be understood that while two preferred embodiments of the present invention have been illustrated and described in detail herein, numerous variations or modifications in said device will undoubtedly occur to those skilled in this art. It is contemplated, for example, that while the ring device comprising the invention has been described herein as being securely attached to the headlight rim once it has been mounted thereon, to deter the theft of said rings, it might be preferred to design said rings so that they can be easily manually disengaged and slid forwardly off the headlight when desired, and the invention is not to be limited in this respect. In short, what is intended to be covered herein is not only the illustrated forms of the present invention but also any and all variations or modifications thereof as may come within the spirit of said invention.

What I claim is:

1. A vehicle headlamp structure comprising: a housing with an open forward end; a light source in said housing; a concavo-convex lens positioned over said housing forward end; a metal headlight rim surrounding said housing, said rim having a rear edge and a forward edge having inturned flange means retaining said lens in covering position over said housing end; a molded flexible plastic ring having a flat body portion removably positionable in closely surrounding relationship on said metal headlight rim, said plastic ring being of lesser width than said metal rim; a plurality of flexible, rearwardly projecting arms formed on said plastic ring member, said arms having hook elements on the rearward ends thereof engageable with the rear edge of said headlight rim to retain said plastic ring in surrounding relation thereon, the flexible nature of said arms permitting the manual disengagement of said hook elements from said headlight rim and permitting the plastic ring to be urged forwardly off of said headlight; an inturned flange formed integrally on the forward portion of said plastic ring and extending radially inwardly to a point adjacent the periphery of said headlight lens, said ring flange having a substantially vertical front surface; a metal ring secured to the front surface of said ring flange; a plurality of spaced sections of luminous material adhered to said metal ring and providing a reflective border substantially surrounding said headlight adapted to alert approaching motorists at night in the event said headlight is inoperative, as well as apprising oncoming motorists of the presence of a parked car at night, the spaces between said luminous material sections exposing the metal ring therebeneath; a tinted fog lens molded of high-heat-resistant plastic formed on a radius of curvature greater than said headlight lens positionable in covering relation over said concavo-convex headlight lens, said plastic fog lens having a rearwardly directed peripheral flange coextensive with and adapted to abut said metal ring; and a plurality of short length bar magnets embedded in said fog lens peripheral flange and being substantially flush with the surface thereof, said bar magnets being positioned around the periphery of said fog lens in a predetermined arrangement corresponding to the spaces between said luminous material sections whereby said tinted plastic fog lens can be mounted over the headlight lens and said bar magnets will magnetically engage the exposed metal ring portions between said spaced luminous material sections to removably retain said fog lens in covering relation over said headlight lens when it is desired to temporarily convert said headlight to a fog light.

* * * * *